(12) United States Patent
Sueishi

(10) Patent No.: US 11,673,428 B2
(45) Date of Patent: Jun. 13, 2023

(54) MOTORCYCLE TIRE FOR RUNNING ON ROUGH TERRAIN

(71) Applicant: Sumitomo Rubber Industries, Ltd., Hyogo (JP)

(72) Inventor: Makoto Sueishi, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 93 days.

(21) Appl. No.: 17/230,227

(22) Filed: Apr. 14, 2021

(65) Prior Publication Data
US 2021/0347208 A1 Nov. 11, 2021

(30) Foreign Application Priority Data

May 11, 2020 (JP) .............................. JP2020-083126

(51) Int. Cl.
*B60C 11/11* (2006.01)
*B60C 11/03* (2006.01)

(52) U.S. Cl.
CPC ....... B60C 11/11 (2013.01); *B60C 2011/0365* (2013.01); *B60C 2011/0367* (2013.01); *B60C 2200/10* (2013.01); *B60C 2200/14* (2013.01)

(58) Field of Classification Search
CPC ............. B60C 11/11; B60C 2011/0365; B60C 2011/0367; B60C 2011/0302; B60C 2200/10; B60C 2200/14; B60C 2011/0381
See application file for complete search history.

(56) References Cited

U.S. PATENT DOCUMENTS

| 2012/0024443 | A1* | 2/2012 | Ishida | B60C 11/13 152/209.18 |
| 2014/0041778 | A1 | 2/2014 | Ichiryu | |
| 2014/0209227 | A1* | 7/2014 | Maeda | B60C 11/11 152/209.1 |
| 2019/0232727 | A1* | 8/2019 | Shirakami | B60C 11/11 |

FOREIGN PATENT DOCUMENTS

| EP | 2 695 750 A1 | 2/2014 |
| EP | 3 501 853 A1 | 6/2019 |
| EP | 3 616 945 A1 | 3/2020 |
| JP | 2014-34334 A | 2/2014 |

* cited by examiner

*Primary Examiner* — Robert C Dye
*Assistant Examiner* — Wendy L Boss
(74) *Attorney, Agent, or Firm* — Studebaker & Brackett PC

(57) ABSTRACT

A tire includes a block 30. The block 30 includes a land 36*b*, a transverse groove 48*b*, a longitudinal groove 50*b*, and a side surface 38*b*. The land 36*b* is flat. The transverse groove 48*b* is recessed from the land 36*b*. The transverse groove 48*b* has inner and outer ends 52 and 54 in an axial direction of the tire. The inner end 52 of the transverse groove 48*b* is open on the side surface 38*b*. The outer end 54 of the transverse groove 48*b* is not open on the side surface 38*b*. The transverse groove 48*b* is localized in the inner region of the block 30 in the axial direction.

10 Claims, 10 Drawing Sheets

MOTORCYCLE TIRE FOR RUNNING ON ROUGH TERRAIN

This application claims priority on and the benefit of Patent Application No. 2020-083126 filed in JAPAN on May 11, 2020. The entire disclosures of this Japanese Patent Application are hereby incorporated by reference.

BACKGROUND OF THE INVENTION

Field of the Invention

The present invention relates to a tire for a motorcycle which runs on rough terrain. In particular, the present invention relates to improvement of a tread of the tire.

Description of the Related Art

A motorcycle tire for running on rough terrain includes a tread having a block pattern. The block pattern includes a sea and a large number of blocks. Each block rises from the sea. In running on a soft ground surface, the blocks stick in the ground surface. The tire exhibits excellent traction performance on the soft ground surface by virtue of the edge effect of the blocks.

Japanese Laid-Open Patent Application Publication No. 2014-34334 (Japanese Patent No. 5629293) discloses a motorcycle tire including a block having a groove. The groove is open on the side surface of the block. The block having the groove has moderate stiffness. The block contributes to grip performance on hard ground surfaces.

In a motorcycle tire including a block having a groove, the groove can generate an undesired moment in the yaw direction. This moment can deteriorate the steering performance.

An object of the present invention is to provide a motorcycle tire for running on rough terrain, the motorcycle tire being excellent in steering performance.

SUMMARY OF THE INVENTION

A motorcycle tire for running on rough terrain according to the present invention includes a tread having a block pattern. The block pattern includes a sea and a plurality of blocks, each block rising from the sea. The blocks include a plurality of transversely grooved blocks. Each transversely grooved block includes a land, a transverse groove recessed from the land, and a side surface extending from the land toward the sea. The transverse groove has inner and outer ends in an axial direction of the tire, the inner end being open on the side surface, the outer end being not open on the side surface.

In the motorcycle tire for running on rough terrain according to the present invention, the transversely grooved blocks generate a suitable moment in the yaw direction. With this tire, a positive rotational force acts on the steering during cornering. The tire is excellent in steering performance.

Preferably, the transverse groove has a width that is large at the inner end and small at the outer end. Preferably, the width of the transverse groove gradually decreases from the inner end toward the outer end. Preferably, a ratio Wi/Wo in the transverse groove is more than 1.0 and 4.0 or less, wherein Wi represents the width at the inner end and Wo represents the width at the outer end.

Preferably, the transverse groove has a depth that is large at the inner end and small at the outer end. Preferably, the depth of the transverse groove gradually decreases from the inner end toward the outer end. Preferably, a ratio Di/Do in the transverse groove is more than 1.0 and 4.0 or less, wherein Di represents the depth at the inner end and Do represents the depth at the outer end.

The transversely grooved block may include a longitudinal groove recessed from the land. The longitudinal groove may be continuous with the transverse groove. Preferably, the longitudinal groove has a toe end that is open on the side surface.

The tread may include: a crown zone located in a center of the tread in an axial direction of the tire; a pair of middle zones, each middle zone being located outward of the crown zone in the axial direction; and a pair of shoulder zones, each shoulder zone being located outward of the middle zone in the axial direction. Preferably, a ratio Ng/Nb in each middle zone is 0.50 or more, wherein Ng represents the number of the transversely grooved blocks and Nb represents the number of all the blocks.

Preferably, a land ratio in the block pattern is 13% or more and 60% or less.

Preferably, a JIS-A hardness of the transversely grooved block is 45 or more and 88 or less.

DESCRIPTION OF THE PREFERRED EMBODIMENTS

The following will describe in detail the present invention based on preferred embodiments with appropriate reference to the drawings.

Figure 1:
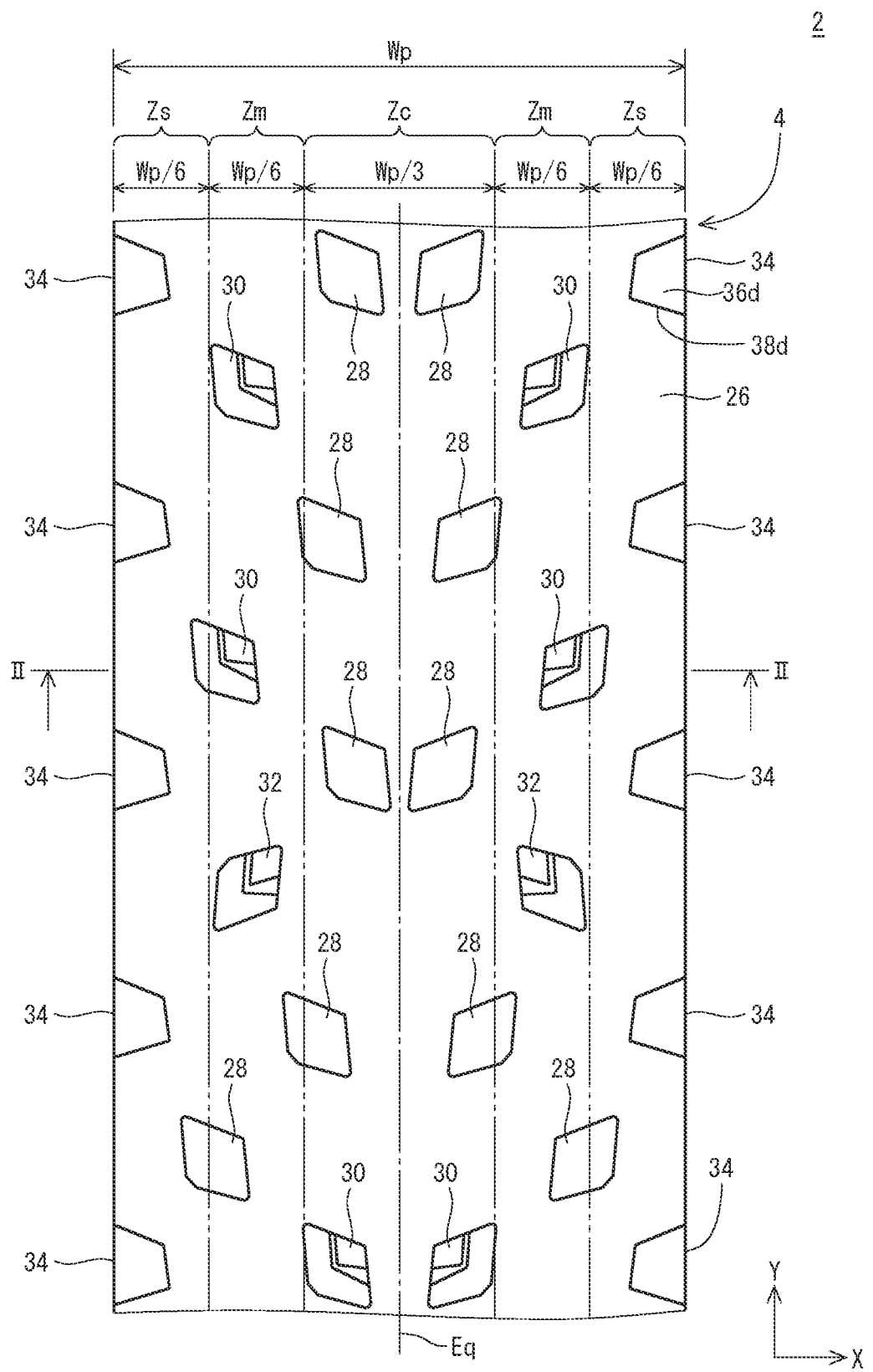
FIG. 1 is a developed view showing a part of a motorcycle tire for running on rough terrain according to an embodiment of the present invention.
Figure 2:
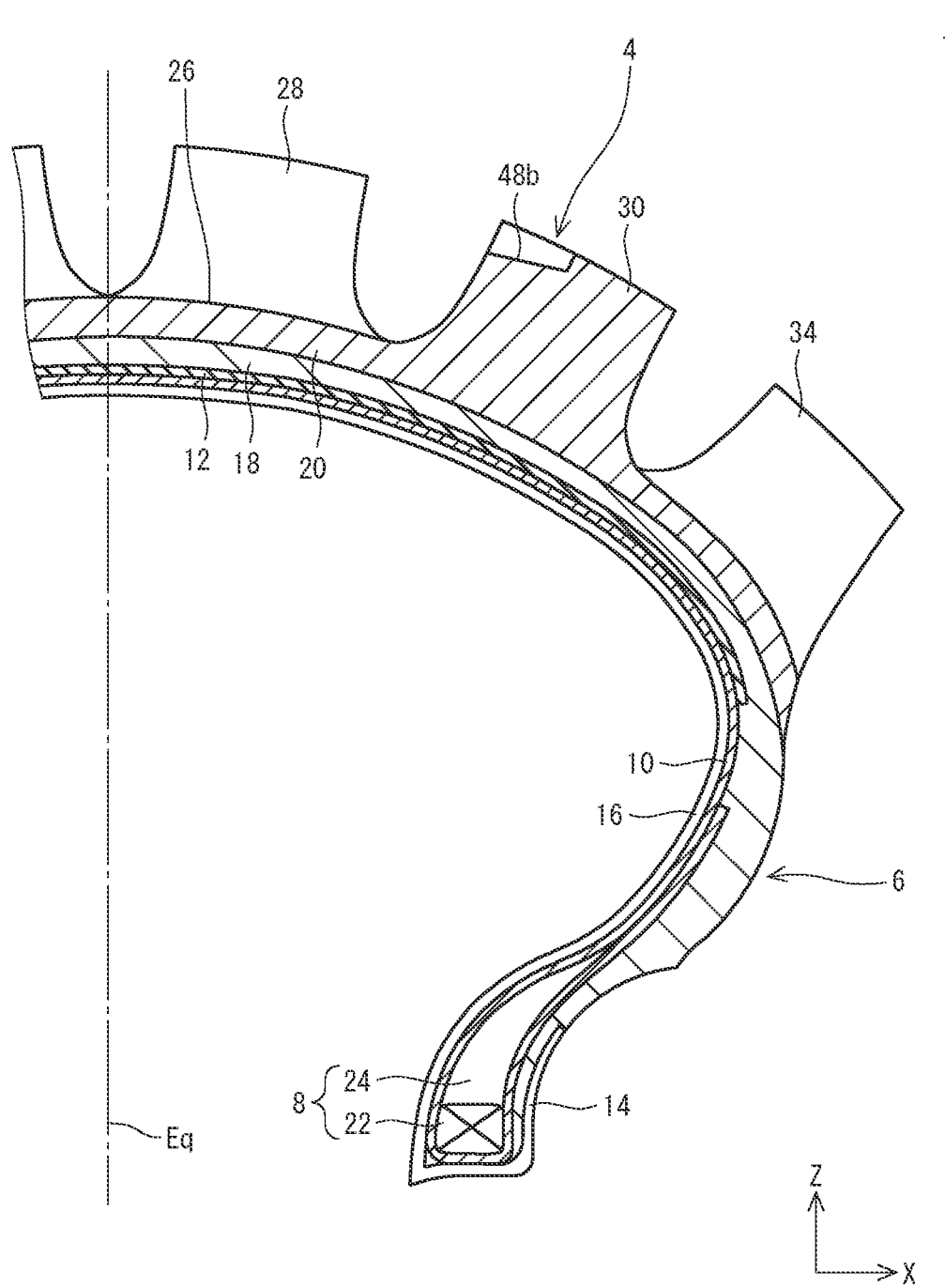
FIG. 2 is a cross-sectional view showing a part of the tire of FIG. 1.

FIGS. 1 and 2 show a motorcycle tire 2. The tire 2 is adapted for running on rough terrain such as that found in mountains, forests, or wildlands. The tire 2 includes a tread 4, sidewalls 6, beads 8, a carcass 10, a belt 12, chafers 14, and an inner liner 16. In FIGS. 1 and 2, the reference character X represents the axial direction of the tire, the reference character Y represents the circumferential direction of the tire, and the reference character Z represents the radial direction of the tire. It should be noted that the surface (curved surface) of the tire 2 is depicted as a flat surface in the developed view of FIG. 1. In FIG. 2, the dashed-dotted line Eq represents the equator plane of the tire 2. The tire 2 is shaped to be substantially mirror symmetric with respect to the equator plane Eq. In the present embodiment, the tire 2 is mounted on a front rim of a motorcycle. The tire 2 according to the present invention may be mounted on a rear rim of a motorcycle.

The tread 4 is shaped to project outward in the radial direction. The tread 4 is constituted by a base 18 and a cap 20. The base 18 is made of a crosslinked rubber. The cap 20 is located outward of the base 18 in the radial direction. The cap 20 is made of a crosslinked rubber.

Each sidewall 6 extends substantially inward in the radial direction from the edge of the tread 4. The sidewall 6 is made of a crosslinked rubber. The sidewall 6 is elastically deformable to absorb shock applied from the ground surface. Further, the sidewall 6 prevents external damage to the carcass 10. In the present embodiment, the material of the sidewall 6 is the same as the material of the base 18. The sidewall 6 and the base 18 are integrally formed.

Each bead 8 is located substantially inward of the sidewall 6 in the radial direction. The bead 8 includes a core 22 and an apex 24 extending outward in the radial direction from the core 22. The core 22 is ring-shaped. In the core 22, a non-stretchable wire is wound in a plurality of turns. A typical material of the non-stretchable wire is steel. The apex 24 is tapered outward in the radial direction. The apex 24 is made of a high-hardness crosslinked rubber.

The carcass 10 extends on and between the two opposite beads 8 and lies along the inner sides of the tread 4 and sidewalls 6. The carcass 10 is layered on the inner liner 16. The carcass 10 is turned up around each core 22 from inside to outside in the axial direction. The carcass 10 includes a single ply. The carcass 10 may include two or more plies.

Although not illustrated, the carcass 10 includes a large number of cords aligned with one another and a topping rubber. The cords obliquely intersect the equator plane Eq. The cords may be substantially perpendicular to the equator plane Eq. The cords are typically made of organic fibers. Preferred examples of the organic fibers include polyester fibers, nylon fibers, rayon fibers, polyethylene naphthalate fibers, and aramid fibers.

The belt 12 is located outward of the carcass 10 in the radial direction. The belt 12 is layered on the carcass 10. The belt 12 reinforces the carcass 10. The belt 12 includes a single layer. The belt 12 may include two or more layers. Although not illustrated, the belt 12 includes a large number of cords aligned with one another and a topping rubber. The cords are inclined with respect to the equator plane Eq. The absolute value of the angle of inclination is 10° or more and 35° or less. The cords are typically made of organic fibers. The material of the cords may be steel.

FIG. 1 shows a part of a tread pattern. In the tire 2 as a whole, the pattern of FIG. 1 is repeated in the circumferential direction. In the present embodiment, the tread pattern is mirror symmetric with respect to the equator plane Eq. The tread pattern may be asymmetric with respect to the equator plane Eq.

In FIG. 1, the arrow Wp represents the periphery of the tread 4. The tread 4 can be divided into a crown zone Zc, a pair of middle zones Zm, and a pair of shoulder zones Zs. The periphery of the crown zone Zc is ⅓ of the periphery Wp of the tread 4. The periphery of each middle zone Zm is ⅙ of the periphery Wp of the tread 4. The total periphery of the two middle zones Zm is ⅓ of the periphery Wp of the tread 4. The periphery of each shoulder zone Zs is ⅙ of the periphery Wp of the tread 4. The total periphery of the two shoulder zones Zs is ⅓ of the periphery Wp of the tread 4.

The tread pattern includes a sea 26, a plurality of first blocks 28, a plurality of second blocks 30, a plurality of third blocks 32, and a plurality of fourth blocks 34. Each block rises from the sea 26. This tread pattern is referred to as a block pattern.

As is apparent from FIG. 1, the first and second blocks 28 and 30 are present in the crown zone Zc. The first, second, and third blocks 28, 30, and 32 are present in the middle zones Zm. The fourth blocks 34 are present in the shoulder zones Zs. In the present invention, for a block lying across the boundary between different zones, the center of area of the contour shape of a land (described in detail later) is used as a basis for determining to which zone the block belongs. The zone in which the center of area is situated is determined as the zone to which the block belongs. The contour shape of the land is identified assuming the absence of any groove (described in detail later) recessed from the land.

Figure 3:
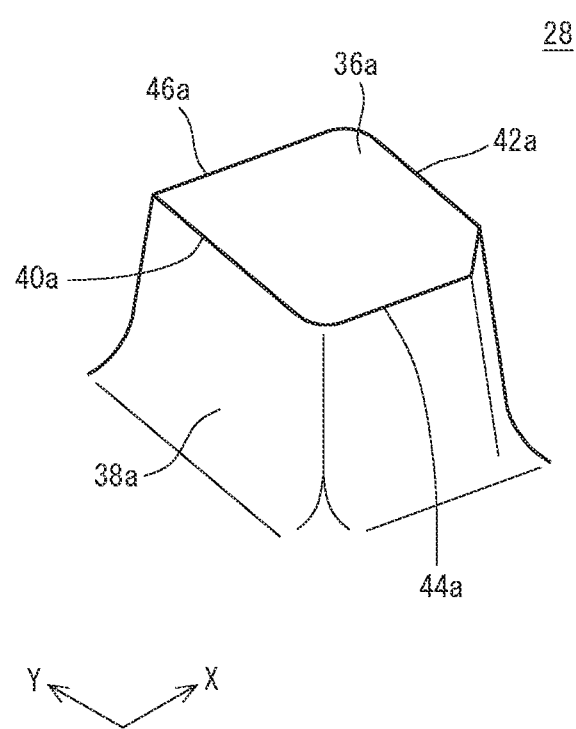
FIG. 3 is a perspective view showing a first block of the tire of FIG. 1.

FIG. 3 is a perspective view showing the first block 28 of the tire 2 of FIG. 1. This first block 28 is located to the right of the equator plane Eq in FIG. 1. The first block 28 located to the left of the equator plane Eq has a shape inverse to that of the first block 28 of FIG. 3. The first block 28 includes a land 36a and a side surface 38a. The land 36a is flat. The land 36a has an inner edge 40a, an outer edge 42a, a heel edge 44a, and a toe edge 46a. The outer edge 42a is located outward of the inner edge 40a in the axial direction. During forward rotation of the tire 2, the heel edge 44a makes contact with the ground first, and then the toe edge 46a makes contact with the ground. The side surface 38a extends from the land 36a toward the sea 26 (see FIG. 1). In FIG. 1, the side surface 38a is omitted.

Figure 4:
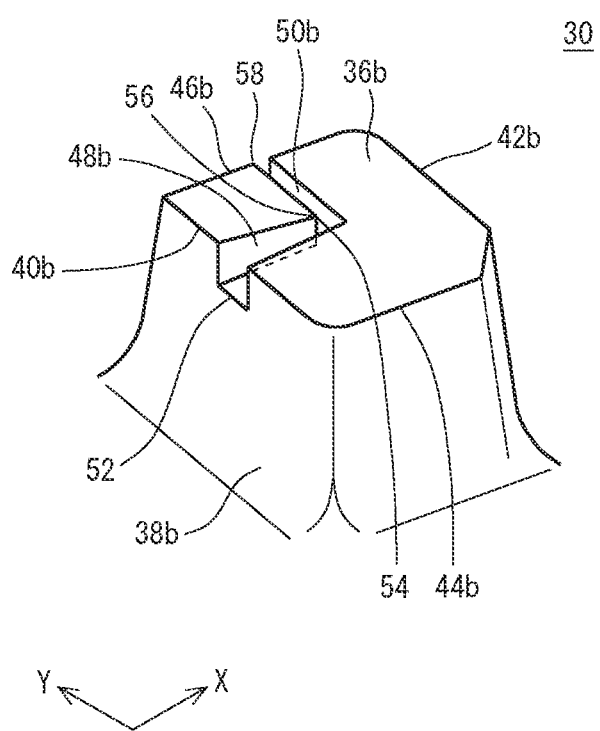
FIG. 4 is a perspective view showing a second block of the tire of FIG. 1.
Figure 5:
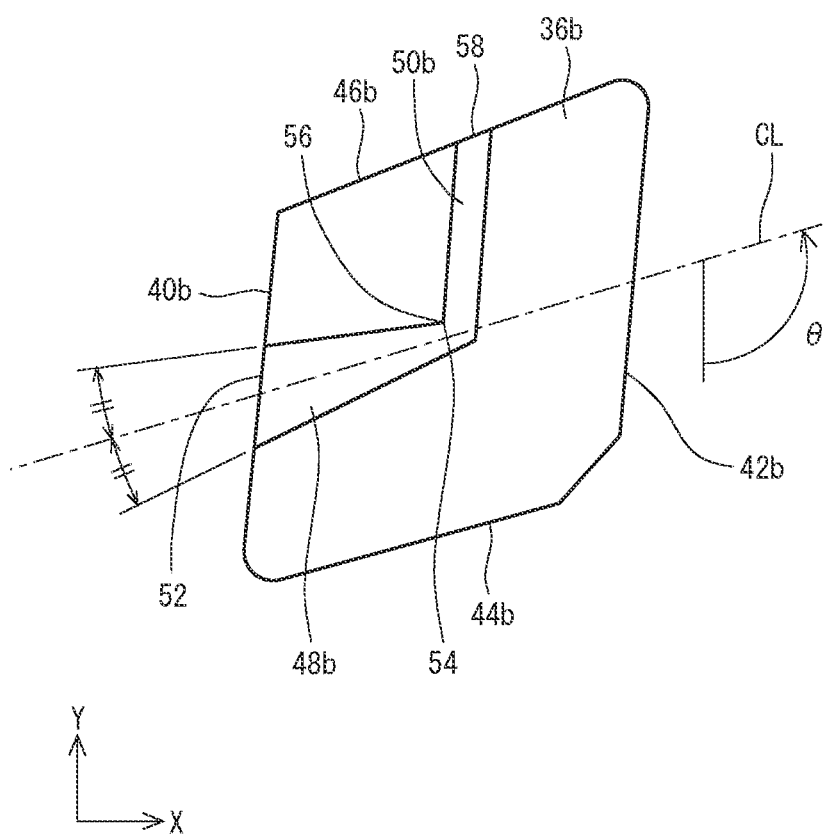
FIG. 5 is a plan view showing the second block of FIG. 4.

FIG. 4 is a perspective view showing the second block 30 of the tire 2 of FIG. 1, and FIG. 5 is a plan view of the second block 30. This second block 30 is located to the right of the equator plane Eq in FIG. 1. The second block 30 located to the left of the equator plane Eq has a shape inverse to that of the second block 30 of FIGS. 4 and 5. The second block 30 includes a land 36b, a transverse groove 48b, a longitudinal groove 50b, and a side surface 38b. The land 36b is flat. The land 36b has an inner edge 40b, an outer edge 42b, a heel edge 44b, and a toe edge 46b. The outer edge 42b is located outward of the inner edge 40b in the axial direction. During forward rotation of the tire 2, the heel edge 44b makes contact with the ground first, and then the toe edge 46b makes contact with the ground. The side surface 38b extends from the land 36b toward the sea 26 (see FIG. 1). In FIGS. 1 and 5, the side surface 38b is omitted.

In the present invention, a block including the transverse groove 48b is referred to as a "transversely grooved block". The second block 30 is a transversely grooved block. The first block 28 previously described is not a transversely grooved block.

The transverse groove 48b is recessed from the land 36b. The transverse groove 48b has inner and outer ends 52 and 54 in the axial direction. The inner end 52 of the transverse groove 48b is open on the side surface 38b. The outer end 54 of the transverse groove 48b is not open on the side surface 38b.

The longitudinal groove 50b is recessed from the land 36b. The longitudinal groove 50b has a heel end 56 and a toe end 58. The toe end 58 of the longitudinal groove 50b is open on the side surface 38b. The heel end 56 of the longitudinal groove 50b is not open on the side surface 38b. The tire 2 may include a transversely grooved block that has no longitudinal groove 50b.

The longitudinal groove 50b is continuous with the transverse groove 48b. The heel end 56 of the longitudinal groove 50b substantially coincides with the outer end 54 of the transverse groove 48b. The longitudinal groove 50b contributes to discharge of mud, water, or any other matter which has entered the transverse groove 48b.

In FIG. 5, the dashed-dotted line CL represents the center line of the transverse groove 48b. The width of the transverse groove 48b is not constant as described in detail later. The center line CL of the transverse groove 48b bisects the center angle representing the extent of the width of the transverse groove 48b. The direction of the center line CL is the direction in which the transverse groove 48b extends. In FIG. 5, the reference character θ represents the angle between a direction in which a groove extends and the circumferential direction (Y direction). The minimum value of the angle θ is 0°, and the maximum value of the angle θ is 180°. In the present invention, a groove for which the angle θ is 45° or more and 135° or less is referred to as a transverse groove 48b. A groove for which the angle θ is 0° or more and less than 45° or the angle θ is more than 135° and 180° or less is referred to as a longitudinal groove 50b.

Since the second block 30 includes the transverse groove 48b (or longitudinal groove 50b), the stiffness of the second block 30 is moderate. The second block 30 can contribute to the grip performance of the tire 2 in running on hard ground surfaces.

As previously stated, the inner end 52 of the transverse groove 48b is open on the side surface 38b. The outer end 54 of the transverse groove 48b is not open on the side surface 38b. In other words, the transverse groove 48b is localized in the inner region of the second block 30 in the axial direction. Thus, the stiffness of the second block 30 is low in the vicinity of the inner edge 40b and high in the vicinity of the outer edge 42b. During cornering of the motorcycle, the second block 30 is subjected to a load. The second block 30 subjected to the load is deformed to a large extent in the vicinity of the inner edge 40b and to a small extent in the vicinity of the outer edge 42b. A moment in the yaw direction is generated due to the difference in the extent of deformation. The direction of the moment is such that the steering is assisted. With the tire 2, a positive rotational force acts on the steering during cornering. The second block 30 can contribute to the steering performance of the tire 2.

The tire 2 is subjected to a great load during cornering. Under the great load, the rider needs to exert a great force to turn the steering. With the tire 2 according to present invention, the second block 30 reduces the burden on the rider.

In view of generation of a suitable moment during cornering, the angle θ is preferably 50° or more and 130° or less, more preferably 55° or more and 125° or less, and particularly preferably 60° or more and 120° or less. In view of water discharge from the transverse groove 48b, the angle θ is preferably 85° or more, more preferably 90° or more, and particularly preferably 95° or more.

Figure 6:
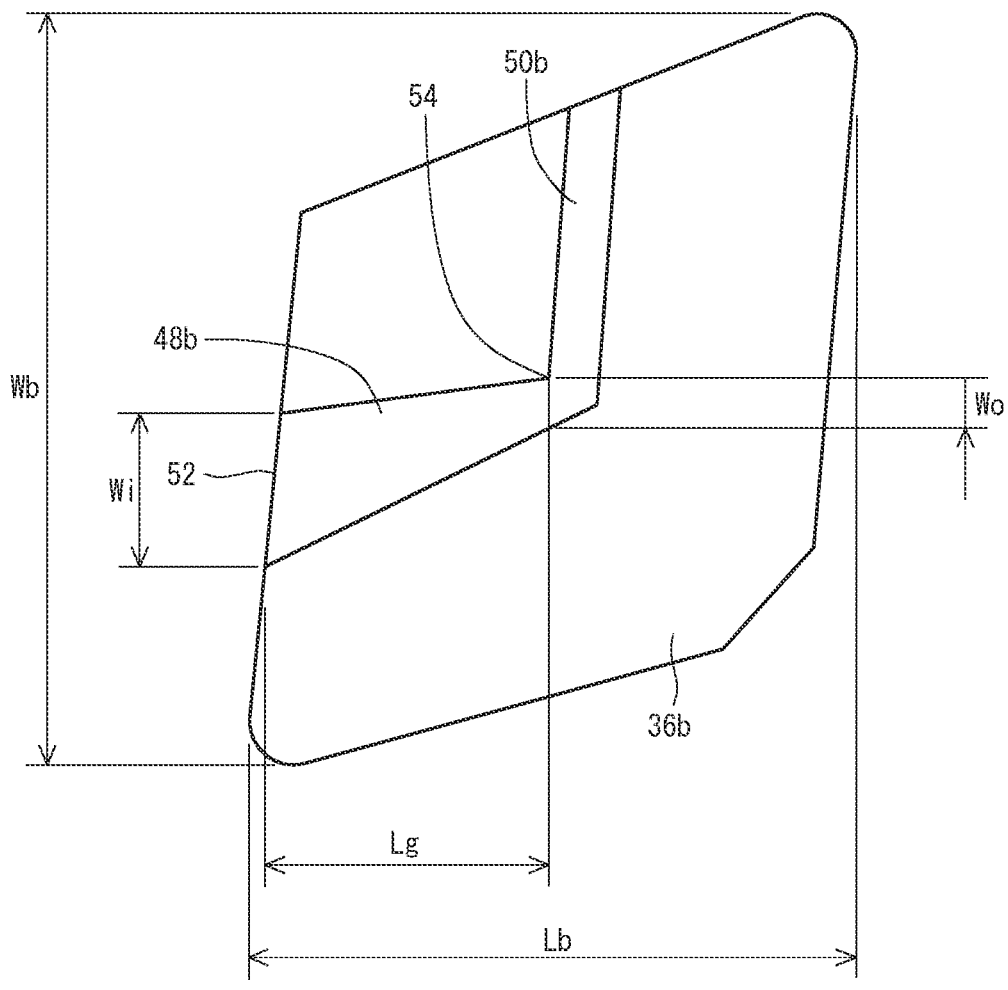
FIG. 6 is an enlarged plan view showing the second block of FIG. 5.

FIG. 6 is an enlarged plan view showing the second block 30 of FIG. 5. As shown in FIGS. 1 and 6, the width of the transverse groove 48b is large at the inner end 52 and small at the outer end 54. Thus, the stiffness of the second block 30 is low in the vicinity of the inner end 52 and high in the vicinity of the outer end 54. The second block 30 can generate a suitable moment during cornering of the motorcycle.

In FIG. 6, the reference character Wi represents the width at the inner end 52 and the reference character Wo represents the width at the outer end 54. The ratio of the width Wi to the width Wo (ratio Wi/Wo) is preferably more than 1.0 and 4.0 or less. The transverse groove 48b with the ratio Wi/Wo in this range can generate a suitable moment during cornering. In view of the moment, the ratio Wi/Wo is more preferably 1.5 or more and particularly preferably 1.8 or more. In the view of the moment, the ratio Wi/Wo is more preferably 3.5 or less and particularly preferably 3.0 or less. The widths Wi and Wo are measured in the circumferential direction.

As is apparent from FIG. 6, the width of the transverse groove 48b gradually decreases from the inner end 52 toward the outer end 54. In the second block 30, the stiffness does not change abruptly. The second block 30 is resistant to chipping.

In FIG. 6, the reference character Wb represents the width of the second block 30. The width Wb is measured in the circumferential direction. In view of generation of a suitable moment during cornering, the ratio of the width Wi to the width Wb (ratio Wi/Wb) is preferably 0.10 or more, more preferably 0.15 or more, and particularly preferably 0.18 or more. In view of grip performance on soft ground surfaces, the ratio Wi/Wb is preferably 0.40 or less, more preferably 0.35 or less, and particularly preferably 0.30 or less.

In FIG. 6, the reference character Lg represents the length of the transverse groove 48b, and the reference character Lb represents the length of the second block 30. The lengths Lg and Lb are measured in the axial direction. In view of generation of a suitable moment during cornering, the ratio of the length Lg to the length Lb (ratio Lg/Lb) is preferably 0.30 or more, more preferably 0.35 or more, and particularly preferably 0.40 or more. In view of grip performance on soft ground surfaces, the ratio Lg/Lb is preferably 0.70 or less, more preferably 0.60 or less, and particularly preferably 0.55 or less.

Figure 7:
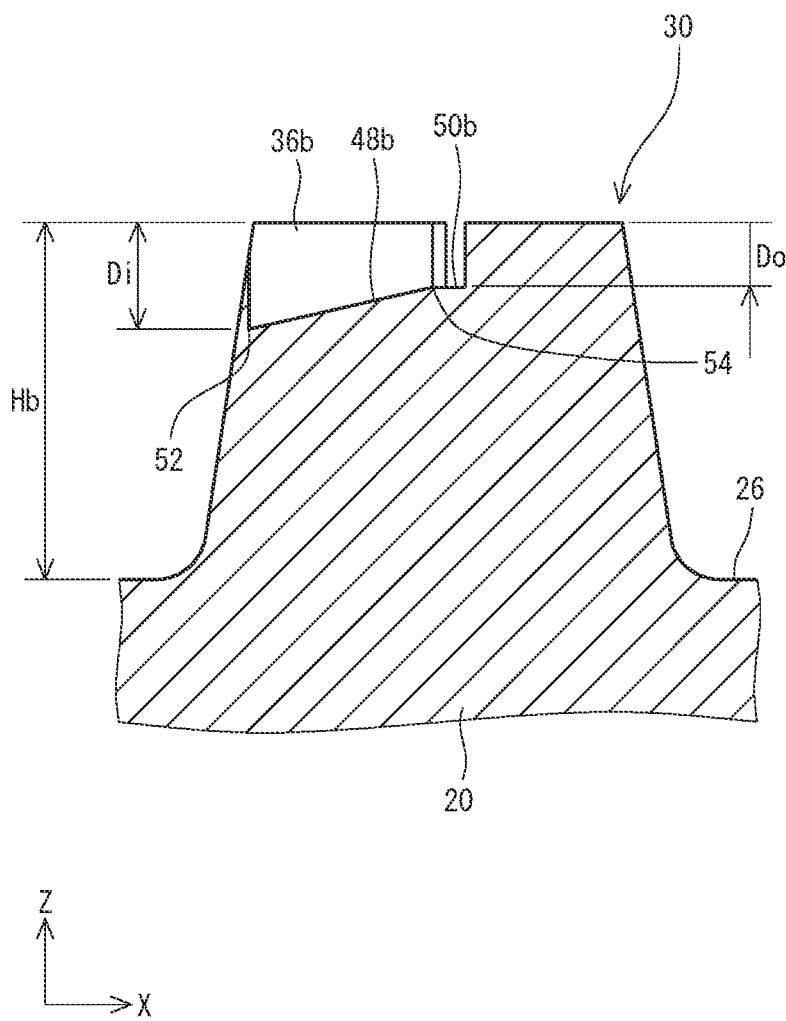
FIG. 7 is a cross-sectional view showing the second block of FIG. 5.

FIG. 7 is a cross-sectional view showing the second block 30 of FIG. 5. FIG. 7 shows a cross-section taken along the plane including the center line CL of FIG. 5. As shown in FIG. 7, the depth of the transverse groove 48b is large at the inner end 52 and small at the outer end 54. Thus, the stiffness of the second block 30 is low in the vicinity of the inner end 52 and high in the vicinity of the outer end 54. The second block 30 can generate a suitable moment.

In FIG. 7, the reference character Di represents the depth at the inner end 52, and the reference character Do represents the depth at the outer end 54. The ratio of the depth Di to the depth Do (ratio Di/Do) is preferably more than 1.0 and 4.0 or less. The transverse groove 48b with the ratio Di/Do in this range can generate a suitable moment. In view of the moment, the ratio Di/Do is more preferably 1.2 or more and particularly preferably 1.3 or more. In view of the moment, the ratio Di/Do is more preferably 3.0 or less and particularly preferably 2.5 or less.

As is apparent from FIG. 7, the depth of the transverse groove 48b gradually decreases from the inner end 52 toward the outer end 54. In this second block 30, the stiffness does not change abruptly. The second block 30 is resistant to chipping.

In FIG. 7, the reference character Hb represents the height of the second block 30. In view of generation of a suitable moment during cornering, the ratio of the depth Di to the height Hb (ratio Di/Hb) is preferably 0.10 or more, more preferably 0.15 or more, and particularly preferably 0.20 or more. In view of grip performance on soft ground surfaces, the ratio Di/Hb is preferably 0.50 or less, more preferably 0.40 or less, and particularly preferably 0.35 or less.

Figure 8:
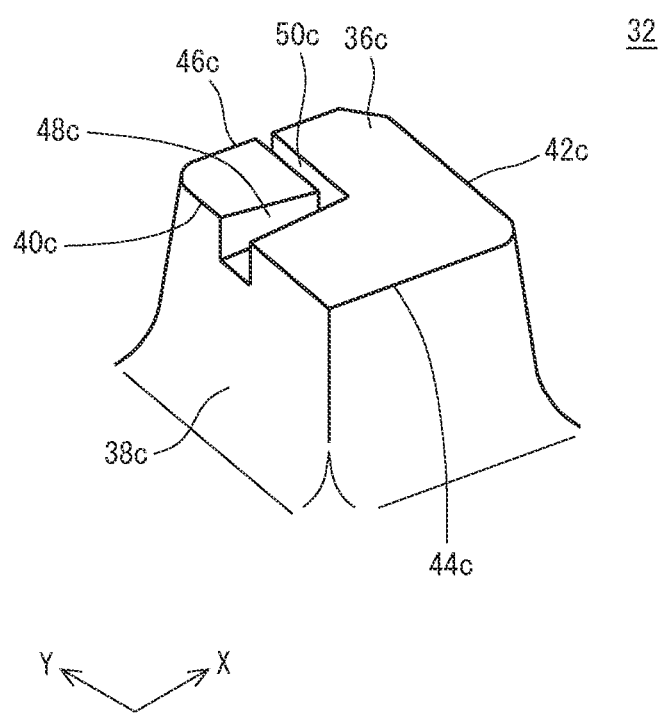
FIG. 8 is a perspective view showing a third block of the tire of FIG. 1.

FIG. 8 is a perspective view showing the third block 32 of the tire 2 of FIG. 1. The third block 32 is located to the right of the equator plane Eq in FIG. 1. The third block 32 located to the left of the equator plane Eq has a shape inverse to that of the third block 32 of FIG. 8. The third block 32 includes a land 36c, a transverse groove 48c, a longitudinal groove 50c, and a side surface 38c. The land 36c is flat. The land 36c has an inner edge 40c, an outer edge 42c, a heel edge 44c, and a toe edge 46c. The outer edge 42c is located outward of the inner edge 40c in the axial direction. During forward rotation of the tire 2, the heel edge 44c makes contact with the ground first, and then the toe edge 46c makes contact with the ground. The side surface 38c extends from the land 36c toward the sea 26 (see FIG. 1). In FIG. 1, the side surface 38c is omitted. The third block 32 is a "transversely grooved block".

The properties of the transverse groove 48c of the third block 32 are substantially the same as those of the transverse groove 48b of the second block 30. The third block 32 including the transverse groove 48c can contribute to the steering performance of the tire 2. Further, the third block 32 can contribute to the grip performance of the tire 2 in running on hard ground surfaces.

As is apparent from FIG. 1, the fourth blocks 34 are present only in the shoulder zones Zs. Although not illustrated in detail, the fourth block 34 also includes a land 36d and a side surface 38d. The land 36d is flat. The side surface 38d extends from the land 36d toward the sea 26. The fourth block 34 does not have any transverse groove 48. The fourth block 34 is not a "transversely grooved block".

During cornering of the motorcycle, either of the middle zones Zm is mainly in contact with the ground. As previously stated, the first, second, and third blocks 28, 30, and 32 are present in each middle zone Zm. The first block 28 is not a transversely grooved block. The second block 30 is a transversely grooved block. The third block 32 is a transversely grooved block. Both the transversely grooved blocks and other blocks are present in each middle zone Zm.

The ratio of the number Ng of the transversely grooved blocks present in the middle zone Zm to the number Nb of all the blocks present in the middle zone Zm (ratio Ng/Nb) is preferably 0.50 or more. In the tire 2 with a ratio Ng/Nb of 0.50 or more, a suitable moment can be generated during cornering. In view of this, the ratio Ng/Nb is more preferably 0.60 or more and particularly preferably 0.70 or more. The ratio Ng/Nb may be 1.00.

During cornering in which the lean angle is small, either the right or left half of the crown zone Zc is mainly in contact with the ground. Even when the right half of the crown zone Zc is mainly in contact with the ground, the left half of the crown zone Zc is also in contact with the ground. Even when the left half of the crown zone Zc is mainly in contact with the ground, the right half of the crown zone Zc is also in contact with the ground. Thus, a transversely grooved block present in the crown zone Zc can generate a negative moment with respect to the cornering direction. In view of prevention of the negative moment, the ratio of the number of the transversely grooved blocks present in the crown zone Zc to the number of all the blocks present in the crown zone Zc is preferably 0.40 or less, more preferably 0.30 or less, and particularly preferably 0.20 or less. This ratio may be zero.

During full-lean cornering, either of the shoulder zones Zs is mainly in contact with the ground. For full-lean cornering, the rider gives importance to whether the rider can perform the steering maneuver at his/her own discretion. In other words, the rider does not prefer naturally occurring moments. In view of this, the ratio of the number of the transversely grooved blocks present in the shoulder zone Zs to the number of all the blocks present in the shoulder zone Zs is preferably 0.40 or less, more preferably 0.30 or less, and particularly preferably 0.20 or less. This ratio may be zero.

The land ratio in the block pattern is preferably 13% or more and 60% or less. In the tire 2 with a land ratio of 13% or more, the ground contact pressure can be uniformly distributed. In the tire 2, damage to the blocks can be reduced. In view of this, the land ratio is more preferably 14% or more and particularly preferably 15% or more. When the tire 2 with a land ratio of 60% or less rolls on a soft ground surface, the blocks sufficiently stick in the ground surface. In view of this, the land ratio is more preferably 50% or less and particularly preferably 40% or less.

The land ratio is the ratio of the total area of all the lands 36 to the area of an imaginary tread surface. The "imaginary tread surface" refers to a tread surface that the tread 4 would have if the tread 4 was devoid of the sea 26, the side surfaces 38, and the grooves and consisted entirely of the lands 36.

The hardness of the transversely grooved block is preferably 45 or more and 88 or less. The transversely grooved block with the hardness in this range can generate a suitable moment during cornering. In view of the moment, the hardness is more preferably 55 or more and particularly preferably 60 or more. In view of the moment, the hardness is more preferably 80 or less and particularly preferably 75 or less. The hardness is measured by pressing a JIS-A hardness scale against the transversely grooved block. The measurement is performed at a temperature of 25° C.

In the present invention, the dimensions and angles of the components of the tire 2 are measured in a state where the tire 2 is mounted on a normal rim and inflated with air to a normal internal pressure. During the measurement, no load is applied to the tire 2. The term "normal rim" as used herein means a rim specified in a standard on which the tire 2 is based. The "standard rim" in the JATMA standard, the "Design Rim" in the TRA standard, and the "Measuring Rim" in the ETRTO standard are normal rims. The term "normal internal pressure" as used herein means an internal pressure specified in a standard on which the tire 2 is based. The "highest air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are normal internal pressures.

Figure 9:
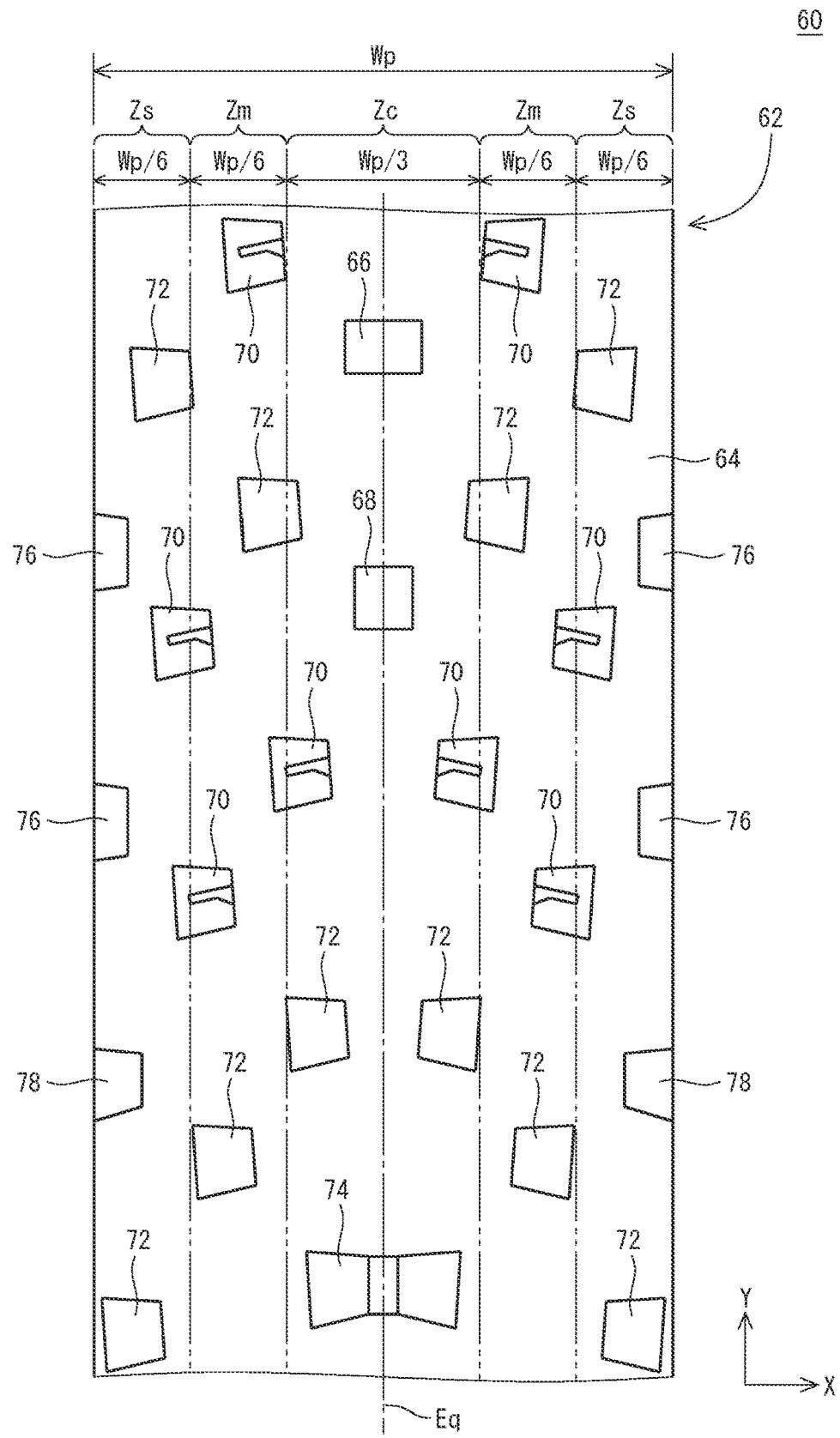
FIG. 9 is a developed view showing a part of a motorcycle tire for running on rough terrain according to another embodiment of the present invention.

FIG. 9 is a developed view showing a part of a motorcycle tire 60 for running on rough terrain according to another embodiment of the present invention. FIG. 9 shows a part of a tread 62. The tread 62 has a tread pattern. The components of the tire 60 other than the tread pattern have the same features as those of the tire 2 shown in FIG. 2.

The tread 62 can be divided into a crown zone Zc, a pair of middle zones Zm, and a pair of shoulder zones Zs. The tread pattern includes a sea 64, a plurality of first blocks 66, a plurality of second blocks 68, a plurality of third blocks 70, a plurality of fourth blocks 72, a plurality of fifth blocks 74, a plurality of sixth blocks 76, and a plurality of seventh blocks 78. Each block rises from the sea 64. This tread pattern is referred to as a block pattern.

As is apparent from FIG. 9, the first, second, third, fourth, and fifth blocks 66, 68, 70, 72, and 74 are present in the crown zone Zc. The third and fourth blocks 70 and 72 are present in the middle zones Zm. The third, fourth, sixth, and seventh blocks 70, 72, 76, and 78 are present in the shoulder zones Zs.

Figure 10:
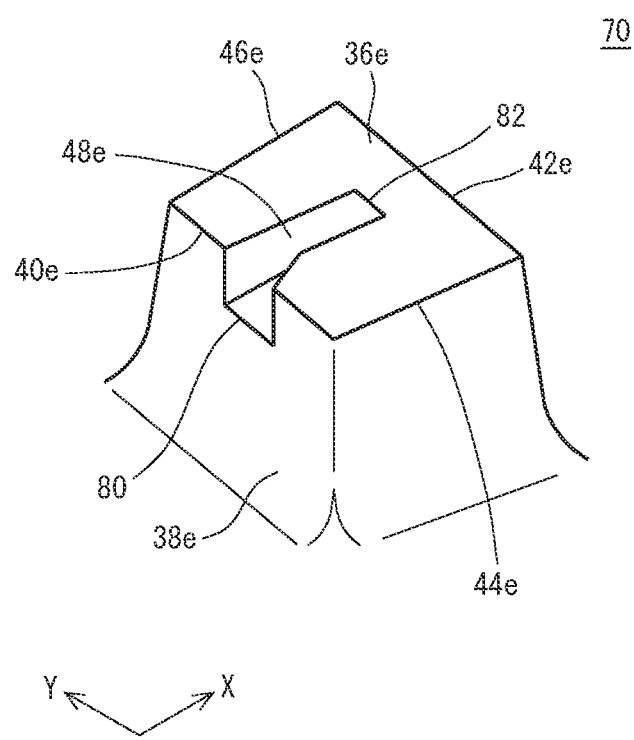
FIG. 10 is a perspective view showing a third block of the tire of FIG. 9.

FIG. 10 is a perspective view showing the third block 70 of the tire 60 of FIG. 9. The third block 70 includes a land 36e, a transverse groove 48e, and a side surface 38e. The land 36e is flat. The land 36e has an inner edge 40e, an outer edge 42e, a heel edge 44e, and a toe edge 46e. The outer edge 42e is located outward of the inner edge 40e in the axial direction. During forward rotation of the tire 60, the heel edge 44e makes contact with the ground first, and then the toe edge 46e makes contact with the ground. The side surface 38e extends from the land 36e toward the sea 64 (see FIG. 9). In FIG. 9, the side surface 38e is omitted. The third block 70 is a "transversely grooved block". The first, second, fourth, fifth, sixth, and seventh blocks 66, 68, 72, 74, 76, and 78 are not "transversely grooved blocks".

The transverse groove 48e of the third block 70 has an inner end 80 in the axial direction, and the inner end 80 is open on the side surface 38e. The transverse groove 48e has an outer end 82 in the axial direction, and the outer end 82 is not open on the side surface 38e. The width of the transverse groove 48e is large at the inner end 80 and small at the outer end 82. The depth of the transverse groove 48e is large at the inner end 80 and small at the outer end 82. In the third block 70 including the transverse groove 48e, the stiffness is low in the vicinity of the inner edge 40e and high in the vicinity of the outer edge 42e. The third block 70 including the transverse groove 48e can contribute to the steering performance of the tire 60. Further, the third block 70 can contribute to the grip performance of the tire 60 in running on hard ground surfaces.

The ratio of the number Ng of the transversely grooved blocks present in the middle zone Zm to the number Nb of all the blocks present in the middle zone Zm (ratio Ng/Nb) is preferably 0.50 or more. In the tire 60 with a ratio Ng/Nb of 0.50 or more, a suitable moment can be generated during cornering. In view of this, the ratio Ng/Nb is more preferably 0.60 or more and particularly preferably 0.70 or more. The ratio Ng/Nb may be 1.00.

EXAMPLES

Example 1

A tire having the structure as shown in FIGS. 1 to 8 was obtained. The size of the tire was "80/100-21". The transversely grooved blocks are present in the middle zones of the tire. The ratio of the number of the transversely grooved blocks (ratio Ng/Nb) is 0.75. In each transversely grooved block, the ratio of the length of the transverse groove (ratio Lg/Lb) is 0.5. The details of the properties of the transverse groove are shown in Table 1 below.

Examples 2 to 5

Tires of Examples 2 to 5 were obtained in the same manner as the tire of Example 1, except the width ratio (ratio Wi/Wo) in the transverse groove of the transversely grooved block was as shown in Table 1 below.

Examples 6 to 8

Tires of Examples 6 to 8 were obtained in the same manner as the tire of Example 1, except the depth ratio (ratio Di/Do) in the transverse groove of the transversely grooved block was as shown in Table 2 below.

Examples 9 to 11

Tires of Examples 9 to 11 were obtained in the same manner as the tire of Example 1, except the ratio of the number of the transversely grooved blocks (ratio Ng/Nb) in the middle zones was as shown in Table 3 below.

Examples 12 and 13

Tires of Examples 12 and 13 were obtained in the same manner as the tire of Example 1, except the width ratio (ratio Wi/Wo) and depth ratio (ratio Di/Do) in the transverse groove of the transversely grooved block were as shown in Table 4 below.

Comparative Example 1

A tire of Comparative Example 1 was obtained in the same manner as the tire of Example 1, except any transversely grooved block was not formed in the middle zones.

Comparative Example 2

A tire of Comparative Example 2 was obtained in the same manner as the tire of Example 1, except the transversely grooved block was provided with a transverse groove that was not open at the inner end in the axial direction but open at the outer end in the axial direction.

Comparative Example 3

A tire of Comparative Example 3 was obtained in the same manner as the tire of Example 1, except the transversely grooved block was provided with a transverse groove that was open at neither the inner end nor the outer end in the axial direction.

Comparative Example 4

A tire of Comparative Example 4 was obtained in the same manner as the tire of Example 1, except the transversely grooved block was provided with a transverse groove that was open at both the inner and outer ends in the axial direction.

[Sensory Evaluation]

Each tire was inflated with air to an internal pressure of 80 kPa. The tire was mounted on the front rim (WM 1.60) of a commercially-available motorcycle for running on rough terrain (engine: four-stroke engine, displacement: 450 cc). A commercially-available tire was mounted on the rear rim of the motorcycle. The motorcycle was allowed to run on a motocross course, and evaluation by the rider was made as to steering performance during cornering. The results are shown as evaluation scores in Tables 1 to 4 below. A higher score indicates a better performance.

TABLE 1

| | Evaluation Results | | | | |
|---|---|---|---|---|---|
| | Example 2 | Example 3 | Example 1 | Example 4 | Example 5 |
| Transverse groove | Present | Present | Present | Present | Present |
| Inner end | Open | Open | Open | Open | Open |
| Outer end | Not open | Not open | Not open | Not open | Not open |
| Wi/Wo | 1.0 | 1.5 | 2.0 | 4.0 | 5.0 |
| Di/Do | 1.5 | 1.5 | 1.5 | 1.5 | 1.5 |
| Ng/Nb | 0.75 | 0.75 | 0.75 | 0.75 | 0.75 |
| Hardness (JIS A) | 70 | 70 | 70 | 70 | 70 |
| Land ratio (%) | 0.15 | 0.15 | 0.15 | 0.15 | 0.15 |
| Steering performance | 108 | 112 | 120 | 112 | 108 |

TABLE 2

Evaluation Results

|  | Example 6 | Example 1 | Example 7 | Example 8 |
|---|---|---|---|---|
| Transverse groove | Present | Present | Present | Present |
| Inner end | Open | Open | Open | Open |
| Outer end | Not open | Not open | Not open | Not open |
| Wi/Wo | 2.0 | 2.0 | 2.0 | 2.0 |
| Di/Do | 1.0 | 1.5 | 4.0 | 5.0 |
| Ng/Nb | 0.75 | 0.75 | 0.75 | 0.75 |
| Hardness (JIS A) | 70 | 70 | 70 | 70 |
| Land ratio (%) | 0.15 | 0.15 | 0.15 | 0.15 |
| Steering performance | 108 | 120 | 112 | 108 |

TABLE 3

Evaluation Results

|  | Example 9 | Example 10 | Example 1 | Example 11 |
|---|---|---|---|---|
| Transverse groove | Present | Present | Present | Present |
| Inner end | Open | Open | Open | Open |
| Outer end | Not open | Not open | Not open | Not open |
| Wi/Wo | 2.0 | 2.0 | 2.0 | 2.0 |
| Di/Do | 1.5 | 1.5 | 1.5 | 1.5 |
| Ng/Nb | 0.25 | 0.50 | 0.75 | 1.00 |
| Hardness (JIS A) | 70 | 70 | 70 | 70 |
| Land ratio (%) | 0.15 | 0.15 | 0.15 | 0.15 |
| Steering performance | 104 | 110 | 120 | 120 |

TABLE 4

Evaluation Results

|  | Example 12 | Example 13 | Comp. Example 1 | Comp. Example 2 | Comp. Example 3 | Comp. Example 4 |
|---|---|---|---|---|---|---|
| Transverse groove | Present | Present | Absent | Present | Present | Present |
| Inner end | Open | Open | — | Not open | Not open | Open |
| Outer end | Not open | Not open | — | Open | Not open | Open |
| Wi/Wo | 1.0 | 0.5 | — | 2.0 | 2.0 | 2.0 |
| Di/Do | 1.0 | 1.0 | — | 1.5 | 1.5 | 1.5 |
| Ng/Nb | 0.75 | 0.75 | — | 0.75 | 0.75 | 0.75 |
| Hardness (JIS A) | 70 | 70 | 70 | 70 | 70 | 70 |
| Land ratio (%) | 0.15 | 0.15 | 0.15 | 0.15 | 0.15 | 0.15 |
| Steering performance | 105 | 104 | 100 | 90 | 100 | 100 |

As seen from Tables 1 to 4, the tires of Examples are excellent in steering performance. The evaluation results clearly demonstrate the advantages of the present invention.

The tire according to the present invention can be mounted on a motorcycle which runs on various kinds of ground surfaces. The foregoing description is given for illustrative purposes, and various modifications can be made without departing from the principles of the present invention.

What is claimed is:

1. A motorcycle tire for running on rough terrain, comprising a tread having a block pattern, wherein
the block pattern includes a sea and a plurality of blocks, each block rising from the sea,
the blocks include a plurality of transversely grooved blocks,
each transversely grooved block includes a land, a transverse groove recessed from the land, a longitudinal groove recessed from the land, and at least four side surfaces each extending from the land toward the sea,
the side surfaces include an axially inner side surface, an axially outer side surface, a toe end transverse side surface and a heel end transverse side surface, and
the transverse groove has inner and outer ends in an axial direction of the tire, the inner end being open on the side surface, the outer end being not open to any side surface, wherein
the longitudinal groove has a heel end and a toe end in a circumferential direction of the tire, the heel end being continuous with the outer end of the transverse groove and the toe end is open on the toe end transverse side surface.

2. The tire according to claim 1, wherein the transverse groove has a width that is large at the inner end and small at the outer end.

3. The tire according to claim 2, wherein the width of the transverse groove gradually decreases from the inner end toward the outer end.

4. The tire according to claim 2, wherein a ratio Wi/Wo in the transverse groove is more than 1.0 and 4.0 or less, wherein Wi represents the width at the inner end and Wo represents the width at the outer end.

5. The tire according to claim 1, wherein the transverse groove has a depth that is large at the inner end and small at the outer end.

6. The tire according to claim 5, wherein the depth of the transverse groove gradually decreases from the inner end toward the outer end.

7. The tire according to claim 5, wherein a ratio Di/Do in the transverse groove is more than 1.0 and 4.0 or less, wherein Di represents the depth at the inner end and Do represents the depth at the outer end.

8. The tire according to claim 1, wherein
the tread includes: a crown zone located in a center of the tread in an axial direction of the tire; a pair of middle zones, each middle zone being located outward of the crown zone in the axial direction; and a pair of shoulder zones, each shoulder zone being located outward of the middle zone in the axial direction, and
a ratio Ng/Nb in each middle zone is 0.50 or more, wherein Ng represents the number of the transversely grooved blocks and Nb represents the number of all the blocks.

9. The tire according to claim 1, wherein a land ratio in the block pattern is 13% or more and 60% or less.

10. The tire according to claim 1, wherein a JIS-A hardness of the transversely grooved block is 45 or more and 88 or less.

* * * * *